United States Patent
Iso et al.

(10) Patent No.: US 11,298,647 B2
(45) Date of Patent: Apr. 12, 2022

(54) PACKING AND MANUFACTURING METHOD THEREFOR

(71) Applicants: IHI Corporation, Koto-ku (JP); University Public Corporation Osaka, Osaka (JP)

(72) Inventors: Yoshiyuki Iso, Tokyo (JP); Ryosuke Ikeda, Tokyo (JP); Shiko Nakamura, Tokyo (JP); Kenji Katoh, Osaka (JP); Tatsuro Wakimoto, Osaka (JP)

(73) Assignees: IHI Corporation, Koto-ku (JP); University Public Corporation Osaka, Osaka (JP)

( * ) Notice: Subject to any disclaimer, the term of this patent is extended or adjusted under 35 U.S.C. 154(b) by 303 days.

(21) Appl. No.: 16/255,876

(22) Filed: Jan. 24, 2019

(65) Prior Publication Data
US 2019/0193015 A1    Jun. 27, 2019

Related U.S. Application Data

(63) Continuation of application No. PCT/JP2017/027378, filed on Jul. 28, 2017.

(30) Foreign Application Priority Data

Aug. 1, 2016    (JP) .............................. JP2016-150984

(51) Int. Cl.
*B01J 19/32*    (2006.01)
*B01D 47/14*    (2006.01)
(Continued)

(52) U.S. Cl.
CPC .............. *B01D 47/14* (2013.01); *B01J 10/00* (2013.01); *B01J 19/247* (2013.01); *B01J 19/32* (2013.01);
(Continued)

(58) Field of Classification Search
CPC .......... B01D 47/14; B01D 53/18; B01J 10/00; B01J 19/247; B01J 19/32;
(Continued)

(56) References Cited

U.S. PATENT DOCUMENTS 2,645,607 A * 7/1953 Allen ............... C10M 175/0033
                                                    196/111
5,392,738 A * 2/1995 Tsutsumi ............. A61H 33/063
                                                    122/31.1
(Continued)

FOREIGN PATENT DOCUMENTS

EP    1 016 457 A2    7/2000
JP    53-044648       9/1951
(Continued)

OTHER PUBLICATIONS

International Search Report dated Sep. 5, 2017 in PCT/JP2017/027378 filed on Jul. 28, 2017 (with English Translation).
(Continued)

*Primary Examiner* — Charles S Bushey
(74) *Attorney, Agent, or Firm* — Oblon, McClelland, Maier & Neustadt, L.L.P.

(57) ABSTRACT

The packing has one or more thin-layer packing elements that are installed upright, the packing element having a main body portion with a planar liquid film formation surface, and one or more wall portions that are provided upright relative to the liquid film formation surface along a linear direction. The side surface of each wall portion has a curved portion at the base thereof connected to the liquid film formation surface, the curved portion curving so as to continue into the liquid film formation surface.

10 Claims, 9 Drawing Sheets

(51) Int. Cl.
  *B01J 10/00*  (2006.01)
  *B01J 19/24*  (2006.01)

(52) U.S. Cl.
  CPC .. *B01J 2219/328* (2013.01); *B01J 2219/3221* (2013.01); *B01J 2219/32206* (2013.01); *B01J 2219/32234* (2013.01); *B01J 2219/32408* (2013.01)

(58) Field of Classification Search
  CPC ...... B01J 2219/32206; B01J 2219/3221; B01J 2219/32234; B01J 2219/32408; B01J 2219/328; B01J 10/02; B01J 2219/32248; B01J 2219/32258; B01J 2219/326
  USPC ............................ 261/108, 110, 112.1, 112.2
  See application file for complete search history.

(56) References Cited

U.S. PATENT DOCUMENTS

| | | | |
|---|---|---|---|
| 5,536,454 A | 7/1996 | Fujii et al. | |
| 5,792,432 A * | 8/1998 | Kato | F01N 3/2814 422/171 |
| 6,560,990 B2 * | 5/2003 | Hayashida | B01D 3/20 261/103 |
| 6,833,117 B1 * | 12/2004 | Kato | B01D 53/8631 422/177 |
| 7,763,101 B2 * | 7/2010 | Maekawa | B03C 3/08 96/44 |
| 10,265,676 B2 * | 4/2019 | Iso | B01D 53/185 |
| 10,596,484 B2 * | 3/2020 | Iso | B01J 10/00 |
| 11,014,065 B2 * | 5/2021 | Ikeda | B01D 53/78 |
| 2017/0014797 A1 | 1/2017 | Iso et al. | |
| 2020/0353405 A1 * | 11/2020 | Iso | B01J 19/32 |

FOREIGN PATENT DOCUMENTS

| | | |
|---|---|---|
| JP | 47-021373 | 10/1972 |
| JP | 06-210121 | 8/1994 |
| JP | 06-210122 | 8/1994 |
| JP | 06-269628 | 9/1994 |
| JP | 06-269629 | 9/1994 |
| JP | 07-121357 | 12/1995 |
| JP | 11-300199 | 11/1999 |
| JP | 2000-249464 | 9/2000 |
| JP | 2010-062111 | 3/2010 |
| WO | WO 2015/151912 A1 | 10/2015 |

OTHER PUBLICATIONS

Written Opinion dated Sep. 5, 2017 in PCT/JP2017/027378 filed on Jul. 28, 2017.

* cited by examiner

PACKING AND MANUFACTURING METHOD THEREFOR

CROSS REFERENCE TO RELATED APPLICATIONS

This application is a continuation application of International Application No. PCT/JP2017/027378, filed on Jul. 28, 2017, which claims priority of Japanese Patent Application No. 2016-150984, filed on Aug. 1, 2016, the entire contents of which are incorporated by reference herein.

BACKGROUND

Technical Field

The present disclosure relates to a packing for promoting mass transfer between gas and liquid in gas-liquid contact and a manufacturing method therefor.

Description of the Related Art

Conventionally, a gas separation apparatus employing gas-liquid contact is used in chemical plants, thermal power plants and the like, to separate, remove or recover a specific gas from a gas to be treated, containing various kinds of gases, such as an exhaust gas. For example, in a carbon-dioxide recovering apparatus, a gas containing carbon dioxide gets into contact with an absorbent such as an aqueous monoethanolamine solution, so that carbon dioxide is absorbed and separated. The absorbent that has absorbed carbon dioxide comes into gas-liquid contact while being heated, thereby releasing carbon dioxide into a gas phase, which is recovered. In addition, in a gas purification apparatus for removing a harmful gas component from an exhaust gas and in a gas separation apparatus for separating a specific gas component from a mixed gas, a specific gas component is absorbed into an absorbent through gas-liquid contact.

Generally, an apparatus that performs gas-liquid contact has a packing for increasing the contact area between an absorbent and a gas, brings the absorbent and the gas into gas-liquid contact on the surface of the packing, and causes a specific gas component in the gas to be absorbed into the absorbent. Various forms have been proposed as specific embodiments of packing useful for increasing the gas-liquid contact area.

In a gas-liquid contact apparatus disclosed in Japanese Patent Application Laid-open No. H6-210121 (Publication Document 1 listed below), in order to increase gas-liquid contact area, the gas-liquid contact surface of the packing is formed of one of a rough surface portion having center line average roughness of 50 μm or more, a porous surface portion having a plurality of drilled holes, and a net-like object. In addition, in a gas-liquid contact apparatus disclosed in Japanese Patent Application Laid-open No. H6-269628 (Publication Document 2 listed below), the gas-liquid contact surface is composed of a material having a net-like body bonded to a surface of a sheet-like body. In a gas-liquid contact apparatus disclosed in Japanese Patent Publication No. H7-121357 (Publication Document 3 listed below), a gas-liquid contact portion is constituted of a gas-liquid contact unit in which a large number of three-dimensional knitted fabrics are arranged in a vertical or almost vertical direction.

In contrast, Japanese Patent Application Laid-open No. H6-269629 (Publication Document 4 listed below) discloses a gas-liquid contact apparatus in which a tubular structure having a horizontal cross-sectional shape of a circle, a semicircular arc, a spiral or the like is used as a packing material.

DOCUMENTS LIST

Publication Document 1: Japanese Patent Application Laid-open (JPA) No. H6-210121
Publication Document 2: Japanese Patent Application Laid-open (JPA) No. H6-269628
Publication Document 3: Japanese Patent Publication (JPB) No. H7-121357
Publication Document 4: Japanese Patent Application Laid-open (JPA) No. H6-269629

BRIEF SUMMARY

However, it takes time and labor to process each of the packings disclosed in the Publication Documents 1 to 3, and manufacturing cost of the packing is greatly increased. Particularly, since a net-like body such as wire gauze and three-dimensional knitted fabrics has insufficient strength and distortion of the shape thereof is easy, it is difficult to make the net-like body stand-alone. Therefore, a support member having strength is required when performing the treatment with the net-like body in a standing state, and thus weight increase due to it causes on the support structure of the packing, that leads to an increase in the weight and the size of the apparatus, increasing material costs and manufacturing costs.

In addition, in a structure in which a flow path of a gas flowing in a packing has a complicated shape, the packing hinders the gas flow and pressure loss increases, resulting in lowering of energy efficiency in gas supply. In order to improve the energy efficiency in gas supply, the gas flow is preferably close to a straight line. In this respect, the filing material disclosed in the Publication Document 4 has a vertical gas-liquid contact surface, and flow resistance of a gas is small. However, with the structure disclosed in this document, it is difficult to supply the liquid accurately to the entire packing and it tends to be uneven supply. Therefore, the absorbing liquid flowing down the packing may concentrate locally, and increasing gas-liquid contact area is unexpectedly difficult. In addition, the structure is not very high in uniformity in space utilization, and there is little room for improvement even in the gas-liquid contact area per filling volume.

In order to keep low the energy consumed during operation, it is necessary to suppress pressure loss due to flow resistance of the gas. For that purpose, it is desirable to use a packing in which sheet materials (thin-layer materials) are arranged in parallel to pass the gas through them. Manufacturing and processing costs of the packing with such a structure is also possible to decrease. However, even in this case, if attaching a reinforcing material for convenience of material selection and structural design, it is necessary to resolve the problem of a decrease in the gas-liquid contact surface area and the problem caused in wetting by a liquid, caused due to presence of the reinforcing material.

The present disclosure has come to create in view of the above-described problems. An object of the present disclosure is to provide a packing for gas-liquid contact and a manufacturing method therefor, capable of realizing preferable gas-liquid contact and efficient component transfer, with suppressing pressure loss in gas-liquid contact while eliminating wetting inhibition caused by the structure.

According to an aspect of the present disclosure, the packing is a packing for gas-liquid contact, having at least one packing element of a thin layer shape that is placed in a standing position, the packing element of the thin layer shape comprising: a main body portion having a planar liquid film-forming surface extending along a liquid flow direction; and at least one wall portion that is provided upright relative to the liquid film-forming surface and extending along a liquid flow linear direction, wherein the wall portion has a side surface which has a curved surface portion at a base connected to the liquid film-forming surface, the curved surface portion curving so as to be continuous to the liquid film-forming surface.

The wall portion may be provided substantially perpendicular to the liquid film-forming surface, and the side surface of the wall portion may have a flat surface portion perpendicular to the liquid film-forming surface and continuous to the curved surface portion. A thin layer flow channel can be formed by setting the distance between the wall portions to be twice or more the height of the wall portion and it is practical to set it to 5 to 1,000 times the height.

It is suitable that the curved surface portion is a concave surface along a cylindrical surface and is curved with a curvature radius at which the critical Weber number in a liquid film formed by a liquid on the liquid film-forming surface is minimized. The curvature radius of the curved surface portion is appropriately 0.5 to 40 mm, and preferably 3 to 10 mm.

The packing element can be configured to have a pair of the wall portions at both side ends of the liquid film-forming surface. Alternatively, the packing element may be configured to have three or more wall portions so that the liquid film-forming surface is divided into a plurality of portions by the wall portions.

The packing is suitable to have a plurality of the packing elements assembled in a parallel state so that the wall portions are positioned to be aligned. The packing can be installed so that the liquid film-forming surface of the packing element is along the vertical direction or a direction inclined with respect to the vertical direction. The liquid supplied flows down along the wall portion on the liquid film-forming surface to form the liquid film.

Moreover, according to an aspect of the present disclosure, the manufacturing method for the packing is a method for manufacturing a packing having at least one packing element of a thin layer shape that is to be used by placing in a standing position, and, in summary, it comprises: a designing step of designing a packing element of the thin layer shape comprising: a main body portion having a planar liquid film-forming surface; and at least one wall portion that is provided upright relative to the liquid film-forming surface and extending along a linear direction, wherein the wall portion has a side surface which has a curved surface portion at a base connected to the liquid film-forming surface, the curved surface portion curving so as to be continuous to the liquid film-forming surface; and a fabricating step of fabricating the designed packing element of the thin layer shape, using a raw material.

It is appropriate that, in the designing step, the wall portion is designed to be substantially perpendicular to the liquid film-forming surface in such a manner that the side surface of the wall portion has a flat surface portion perpendicular to the liquid film-forming surface and continuous to the curved surface portion.

Moreover, it is suitable that, in the designing step, the curved surface portion is designed to be a concave surface along a cylindrical surface. It is appropriate that the manufacturing method further comprises: a determination step of determining an optimum value of a curvature radius of the curved surface portion according to an angle of the liquid film-forming surface with respect to a horizontal plane in use of the packing, physical properties of a liquid to be used, and characteristics related to contact of the liquid with the packing element, wherein the determined optimum value of the curvature radius is applied to the packing element designed in the designing step.

It is allowable that, in the designing step, the packing element is designed to have a pair of the wall portions at both side ends of the liquid film-forming surface. Alternatively, the packing element can be designed to have three or more wall portions so that the liquid film-forming surface is divided into a plurality of portions by the wall portions.

The manufacturing method for the packing may further include an assembling step of assembling a plurality of the packing elements in parallel to the packing so that the wall portions are positioned to be aligned, and the packing can be assembled so that the liquid film-forming surface of the packing element is along the vertical direction or a direction inclined with respect to the vertical direction. The liquid supplied to the packing flows down along the wall portion on the liquid film-forming surface to form the liquid film, and the flow direction of the liquid coincides with the linear direction of the wall portion.

It is possible to obtain a packing for gas-liquid contact, capable of suppressing pressure loss in gas-liquid contact while realizing preferable gas-liquid contact and efficient component transfer, and it becomes possible to provide a gas-liquid contact apparatus having good energy efficiency during operation.

DETAILED DESCRIPTION OF EMBODIMENTS

Figure 1:
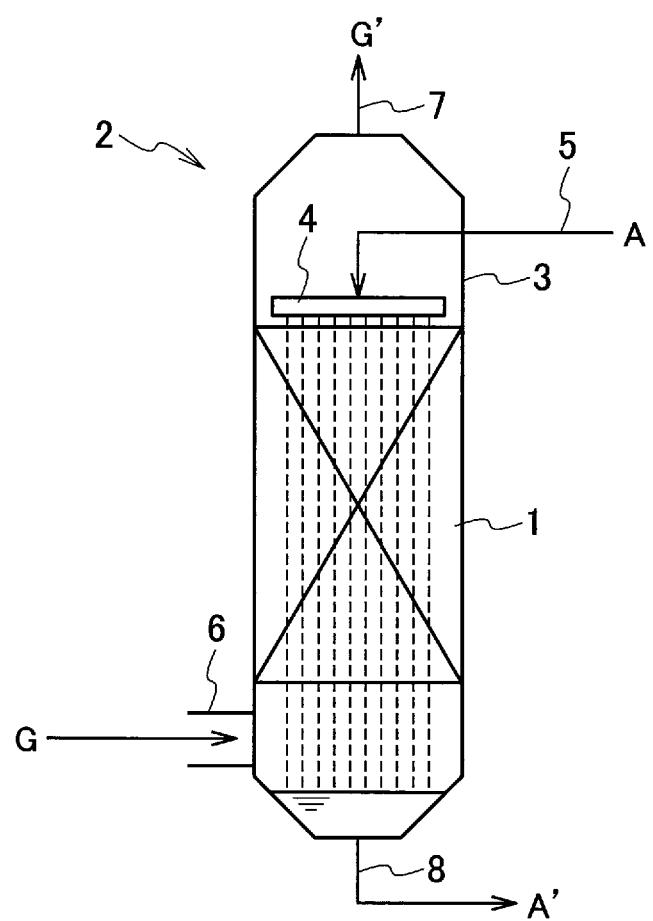
FIG. 1 is a schematic configuration diagram illustrating one embodiment of a gas-liquid contact apparatus in which a packing is used.

Description for embodiments of the present disclosure will follow, with reference to the accompanying drawings. Note that dimensions, materials, concrete numerical values and the like indicated in the embodiments are only examples for facilitating understanding the contents of the present disclosure and do not limit the present disclosure. Moreover, in the description and the drawings of the present disclosure, elements having substantially an identical function and configuration are shown with denoted by identical reference numerals, and overlapped description will be omitted. Elements not directly related to the present disclosure are not illustrated.

A gas-liquid contact apparatus using a packing can be schematically described, for example, as shown in FIG. 1. The packing 1 using flat plate materials F is loaded in a container 3 of the gas-liquid contact apparatus 2 and can be used as a packing for gas-liquid contact. A liquid A is supplied to a spray pipe 4 through a liquid supply line 5 in order to disperse the liquid A to the packing 1 from the spray pipe 4 disposed above the packing 1. Supplying a gas G to the gas-liquid contact apparatus 2 through a gas supply line 6, the liquid flows down along the flat plate materials F of the packing 1 and contacts the rising gas G. During this gas-liquid contact, the liquid forms a liquid film on the packing 1 and, for example, absorbs a specific component of the gas G. The gas G' from which the specific component has been removed is discharged to the outside through a gas discharge line 7 connected to the top of the container 3. The liquid A' that has functioned for an absorbing liquid is stored in the bottom portion of the container 3 and then discharged to the outside through a drain line 8 connected to the bottom portion. For the packing 1, rectangular flat plate materials placed in a standing position are used, and the flow paths of the gas G and the liquid A in the packing 1, in the gas-liquid contact apparatus 2, are straight and simple gaps of a thin layer shape which are between the flat plate materials arranged in parallel at predetermined intervals. Therefore, the flow resistance is small and decrease in the manufacturing and processing costs is possible. Moreover, it is possible to control the gas flow rate by appropriately adjusting the interval between the plate materials.

Flow resistance of the gas when the gas comes to contact with the liquid affects the energy consumption during operation. In order to reduce operating costs, it is effective to use a plurality of plate materials arranged in parallel to configure the packing. However, as the plate material is prepared thinner in order to increase the gas-liquid contact area per volume, the strength lowers and deformation and deflection are more likely to occur. The packing is required to have durability against the weight and the load of falling energy of the liquid supplied thereto. In addition, in the case of a multistage apparatus or a large-sized apparatus, durability against the weight loaded thereon and strength against the load assumed to take place during assembling work of the apparatus are also required. Therefore, even though the plate material can satisfactorily maintain a self-standing state in the vertical direction, the plate material may be required to have structural reinforcing so that the plate material can withstand the loads during operation and assembly.

Figure 2A:
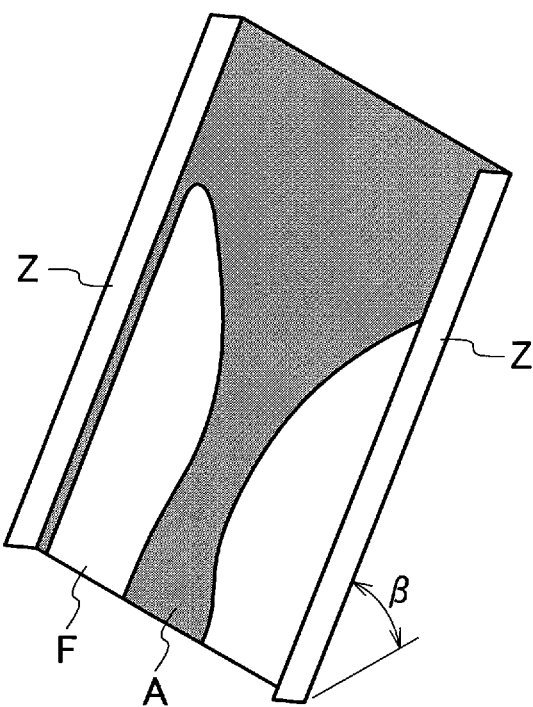
FIG. 2A is a schematic diagram illustrating a liquid flow analysis on a plate material constituting the packing.

Prevention of deformation and deflection of the plate material is possible by attaching a reinforcing material extending along the direction of liquid flow. For example, as shown in FIG. 2A, ribs Z perpendicular to the wetted surface (liquid film-forming surface) of the flat plate material F are set upright on the both side ends of the flat plate material F along the liquid flow direction as a reinforcing material. Then they improve the strength of the flat plate material F in the liquid flow direction to suppress deflection and deformation. At the same time, they also serve as a spacer for holding the interval among the plurality of flat plate materials F. However, there is a concern that existence of the reinforcing member may cause not only loss of the wetted area in the part to which the reinforcing material is attached but also reduction in the wetted area due to the influence on the liquid film around it. Specifically, the liquid film formed by the liquid A flowing down over the surface of the plate material breaks in the vicinity of the reinforcing material as shown in FIG. 2A, and the flow of the liquid converges, thereby it concentrates and flows locally. Thus, a phenomenon (dry out) occurs in which a part of the liquid film-forming surface extending in the liquid flow direction comes to no formation of liquid film. When the liquid film breaks, not only the wetted area (gas-liquid contact area) decreases but also the flow rate of the liquid A increases and the time that the liquid stays on the surface of the packing becomes short. That is, the gas-liquid contact efficiency, i.e. the absorption efficiency significantly decreases. Therefore, in the reinforcement, it is necessary to configure such a form as to suppress the influence on the liquid film formation as much as possible.

Figure 2B:
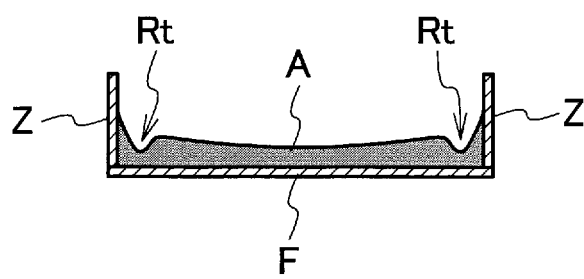
FIG. 2B is a cross-sectional view horizontal to the flow direction, for explaining a liquid film formed on the plate material of FIG. 2A.

In the formation of the liquid film as shown in FIG. 2A, tension acts in the directions along the surfaces of the flat plate material F and the ribs Z due to the wettability of both members. Then the liquid film forms a meniscus (curvature of the liquid film surface) near the ribs Z. At this time, the surface of the liquid film has a shape in which a minimized region Rt that the thickness of the liquid film is locally minimized, as shown in FIG. 2B, appears near the ribs Z. When the occurrence of the minimized region Rt becomes significant, the liquid film breaks and the dry out occurs. In other words, if conditions are found to allow formation of a liquid film so that the minimized region Rt does not appear, it is possible to provide a packing in which dry out is suppressed during formation of the liquid film and gas-liquid contact is performed satisfactorily.

Figure 3:
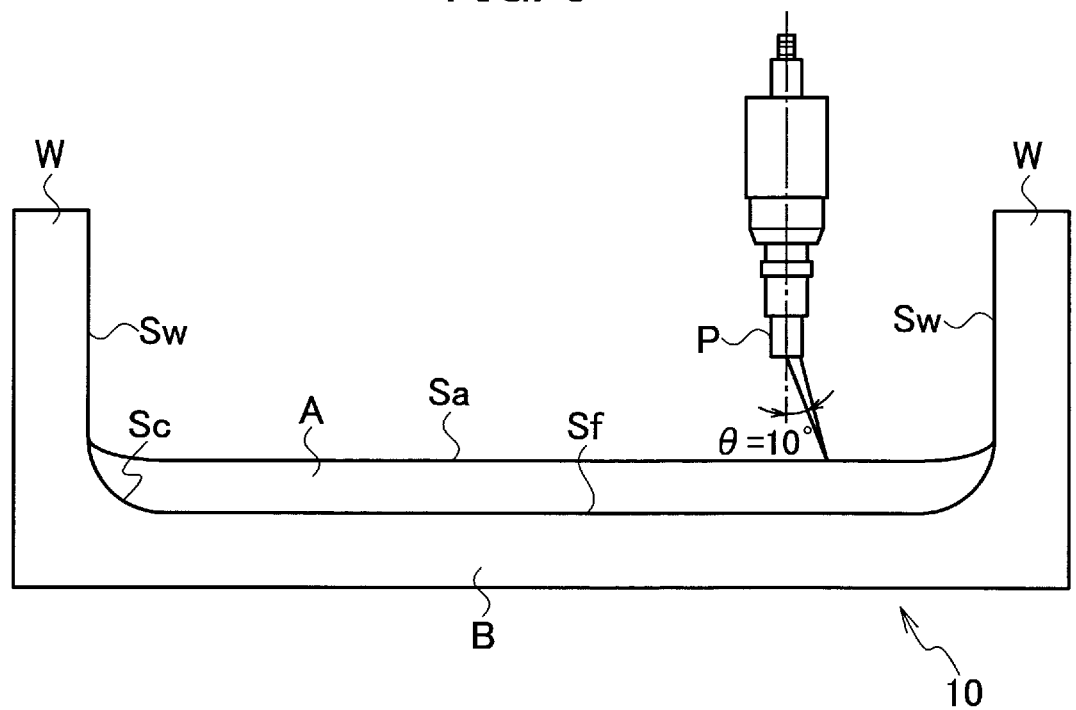
FIG. 3 is a cross-sectional view for explaining a packing element constituting the packing.

The meniscus phenomenon mainly changes with the three-phase contact angle of solid-gas-liquid, and the physical properties of the liquid, the state of the solid surface and the like are influence factors. That is, formation of the liquid film varies depending on the physical properties of the liquid and the solid-liquid contact conditions. Therefore, in regard to a packing element having a main body portion having a planar liquid film-forming surface and at least one wall portion standing on the liquid film-forming surface along a linear direction, the inventors have researched the surface shape of the liquid film formed in a state where the liquid flows on the liquid film-forming surface along the wall portion. Then they have investigated the factors affecting liquid film formation. As a result, it has been found effective in suppressing dry out that the packing element 10 is formed in a shape curved so that, as shown in FIG. 3, the boundary with the main body portion B at the base of the wall portion W is continuous and not angular. Accordingly, as one embodiment of the packing element, it is proposed that the side surface Sw of the wall portion W of the packing element 10 has a curved surface portion Sc curved so as to be continuous with the liquid film-forming surface at the base connected to the liquid film-forming surface Sf of the body portion B. Through the curved surface portion Sc, the liquid film-forming surface Sf and the side surface Sw of the wall portion W connect smoothly. The curved surface portion Sc is effective in suppressing the minimized region Rt appearing in the shape of the liquid film surface Sa of the liquid, and it is possible to optimize the curvature of the curved surface portion Sc so that the minimized region Rt does not appear.

For example, when a curved surface portion Sc is formed in a cylindrical surface shape, that is, into a concave surface along a cylindrical surface, an optimum value exists for the curvature radius Rs at which the minimized region Rt may disappear from the shape of the liquid film surface Sa. It is possible to determine the optimum value of the curvature radius Rs by using either of 1) experimental measurement, 2) flow analysis based on computation fluid dynamics (CFD), or 3) theoretical calculation. Furthermore, these determination methods include a plurality of forms with different approaches. As one form, there is a determination method by finding the surface shape of the liquid film formed on the liquid film-forming surface, and, as another form, a determination method by finding the critical Weber number $We_c$ can be mentioned. In the method of finding the surface shape of the liquid film, it is possible to determine directly the curvature radius Rs when it comes to the optimum surface shape among the obtainable surface shapes. In the method of finding the critical Weber number $We_c$, the correlation between the critical Weber number $We_c$ and the curvature radius Rs is examined, and the value of the curvature radius Rs when the critical Weber number $We_c$ becomes the minimum can be regarded as the optimum value.

<Determination of Optimum Value by Experimental Measurement>

Figure 4:
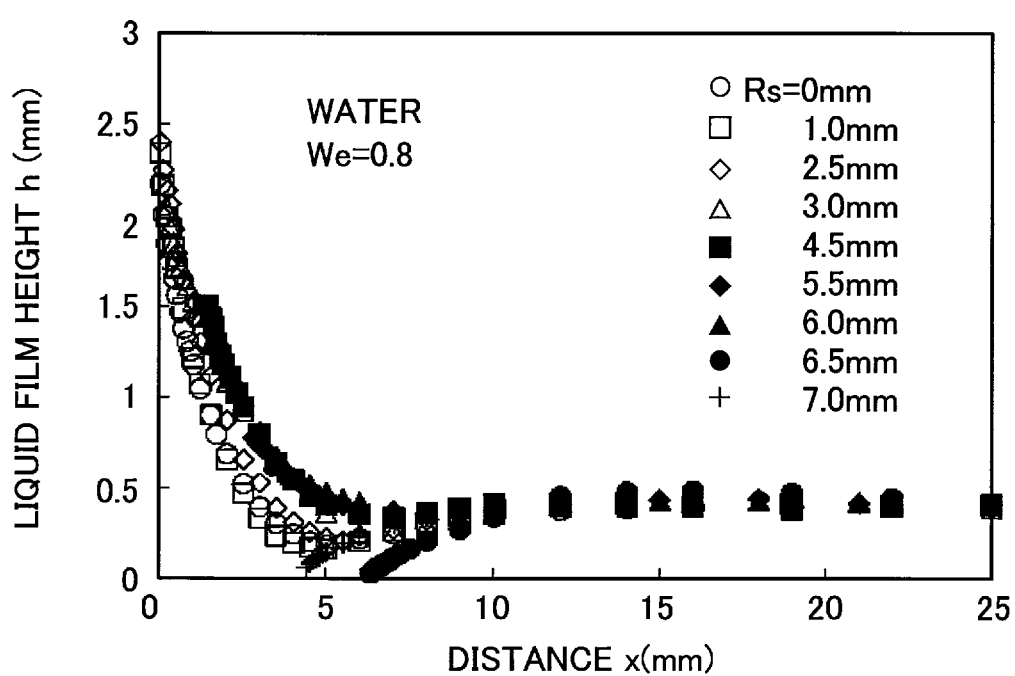
FIG. 4 is a graph prepared based on experimental measurement and illustrating a surface shape of the liquid film formed on the packing element having a curved surface portion (vertical axis: liquid film height h (mm), horizontal axis: distance x (mm) from the wall portion).

FIG. 4 is a graph showing the results of measurement of the shape of the liquid film surface Sa by experiments. In the experimental measurement, water (20° C., Weber number We=0.8) has been supplied as a liquid to the packing element 10 (made of SUS304 steel, distance between the wall portions: 50 mm, angle β relative to the horizontal plane of the liquid film-forming surface at the time of use: 60°) to flow down on the liquid film-forming surface Sf and form the liquid film. Then the position (liquid film height h) of the liquid film surface Sa has been measured according to the stylus method using a needle probe P. By plotting the relationship between the distance x from the side surface Sw of the wall portion W and the liquid film height h (based on the liquid film-forming surface of the main body portion B) as a graph, the surface shape of the liquid film as shown in FIG. 4 is obtained. It is understood from the graph of FIG. 4 that the shape of the liquid film changes by changing the curvature radius Rs of the curved portion Sc of the packing element 10. In FIG. 4, a liquid film shape in which the minimized region of the liquid film height is clearly present is shown when the curvature radius Rs is in the range of 1 to 3 mm. However, the minimized region decreases as the curvature radius Rs increases and disappears at the curvature radius Rs=6 mm. Therefore, under the setting conditions in the measurement of FIG. 4, the optimum value of the curvature radius Rs of the curved surface portion Sc of the packing element 10 is about 6 mm. In this manner, it is possible to determine the optimum curvature such that the minimized region does not appear in the surface shape of the liquid film, by changing the curvature of the curved surface portion Sc provided at the boundary between the wall portion W and the main body portion B and examining the change in the surface shape of the liquid film. Therefore, it is possible to design the shape of a suitable packing element by performing such measurement under desired gas-liquid contact conditions.

Figure 5:
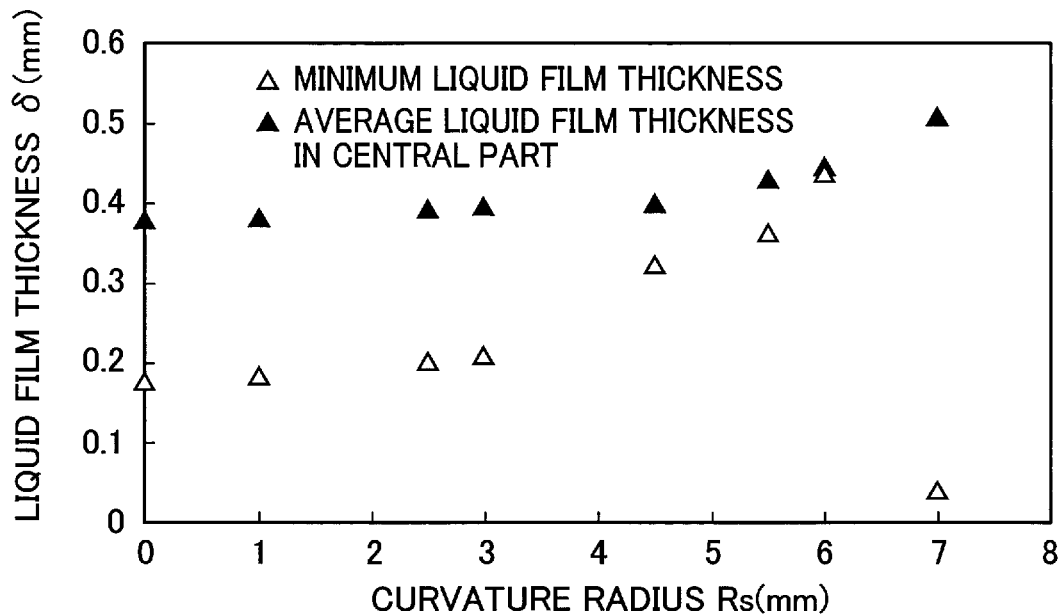
FIG. 5 is a graph illustrating a correlation between a liquid film thickness $\delta$ (mm) of the liquid film shown in FIG. 4 and a curvature radius Rs (mm) of the curved surface portion of the packing element.

From the measurement data used for making the graph of FIG. 4, the minimum liquid film height and the average liquid film height in the central part (distance: 25 mm) are extracted for each curvature radius Rs, and the relationship between these and the curvature radius Rs is examined, thereby obtaining the result as shown in FIG. 5. In FIG. 5, the difference in the height (thickness) between the central part and the minimized region of the liquid film becomes extremely small at the curvature radius Rs of approximately 6 mm, and the minimized region almost disappears. In other words, the change in the height difference of the liquid film is remarkable, and it is easy to use for judgment. Therefore, it is possible to say that determining the optimum value of the curvature radius Rs based on the height difference of the liquid film is a method suitable for automation by data processing. Therefore, it is possible to easily determine the optimum value of the curvature radius Rs, by extracting the minimum value of the height of the liquid film and the value of the center part of the liquid film for each curvature radius Rs from the measurement data of the surface shape of the liquid film, and calculating the difference between the heights.

Figure 6:
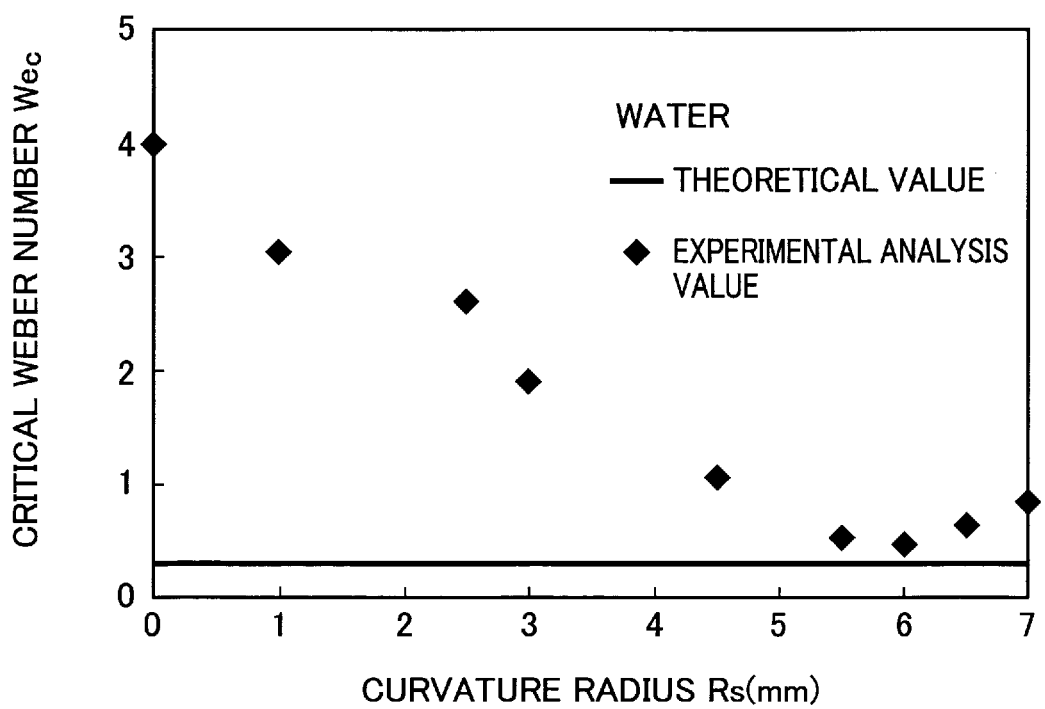
FIG. 6 is a graph prepared based on experimental measurement and illustrating a correlation between a critical Weber number $We_c$ in the liquid film formed on the packing element and the curvature radius Rs (mm) of the curved surface portion of the packing element.

FIG. 6 is a graph showing an example of the relationship between the critical Weber number $We_c$ obtained by experimental measurement and the curvature radius Rs of the curved surface portion Sc. The critical Weber number $We_c$ is a Weber number We in a critical condition where the dry out appears/disappears in forming the liquid film. And the Weber number We is a dimensionless number that can be expressed by the following formula (1) (wherein ρ is the density of the liquid, U and δ are the average velocity of the liquid and the average thickness of the liquid film according to Nusselt's theoretical formula, and σ is the surface tension of the liquid). Therefore, the Weber number We is increased, for example, by increasing the flow rate of the liquid to be supplied to the liquid film-forming surface (=the liquid film speed or the liquid film thickness increases). It has been also found that the Weber number We has a correlation with an area ratio of the liquid film (a ratio of the area where the liquid film is formed relative to the entire liquid film-forming surface). Specifically, the area ratio of the liquid film increases as the Weber number We increases, and the area ratio of the liquid film reaches 1 (the liquid film is formed on the entire surface and the dry out disappears) at the critical Weber number $We_c$. In other words, the critical Weber number $We_c$ corresponds to the minimum value of the liquid film thickness that can be taken under the condition that the dry out disappears. Therefore, the relationship between the critical Weber number $We_c$ obtained in the experiment of forming the liquid film on the liquid film-forming surface Sf of the packing element 10 and the curvature radius Rs in the curved surface portion Sc of the packing element 10 is examined, and a curvature radius Rs at which the critical Weber Number $We_c$ becomes the minimum is regarded as the optimum value.

$$We = (\rho \times U^2 \times \delta)/\sigma \quad (1)$$

The graph of FIG. 6 has been obtained, with use of the packing element 10 and the liquid used in the experimental measurement of FIG. 4, by gradually increasing the flow rate of the liquid to be supplied to the liquid film-forming surface to determine the critical condition at which the dry out disappears. Then, from the measurement result at that time, the graph has been prepared based on the critical Weber number $We_c$ obtained. The theoretical value in the graph shows the value of the critical Weber number $We_c$ in a flat plate material having no wall portion that is obtained from the formula (4) described later. The closer the critical weber number $We_c$ obtained by measurement approaches the theoretical value, the higher the effectiveness of the curved surface portion can be considered. The critical Weber number $We_c$ in FIG. 6 shows the minimum value when the curvature radius Rs is about 6 mm, and the optimum value of the curvature radius Rs of the curved surface portion Sc is approximately 6 mm also in the relationship between the critical weber number $We_c$ and the curvature radius Rs. Moreover, the critical Weber number $We_c$ when the curvature radius Rs is optimal is very close to the value of the flat plate material having no wall portion. From this, it is possible to say that the formation of a liquid film in a state very close to a flat plate material having no wall portion is realized.

As can be seen from FIG. 4 to FIG. 6, it is possible to suppress the appearance of the minimized region by optimizing the curvature radius Rs in a design to provide a curved surface portion at the base of the wall portion W and bend in a cylindrical surface shape. In the liquid film forming conditions shown in FIG. 4 to FIG. 6, the optimum value is about 6 mm, and it is possible to form the liquid film satisfactorily even with the curvature radius Rs of about 5.0 to 6.5 mm. Since the formation of the liquid film varies depending on the surface tension, density, and kinetic viscosity of the liquid, and on the state (material quality, roughness, etc.) of the liquid film-forming surface, the optimum value of the curvature radius Rs also changes if such conditions change. Moreover, since the liquid film formation also varies depending on the angle β of the liquid film-forming surface, the optimum value also changes if the packing usage situation is different. It is also possible by using CFD analysis to obtain the results as shown in FIG. 4 to FIG. 6. Therefore, instead of experimental measurements, CFD analysis may be used to determine the curvature radius Rs and accommodate to change of condition setting.

Figure 7:
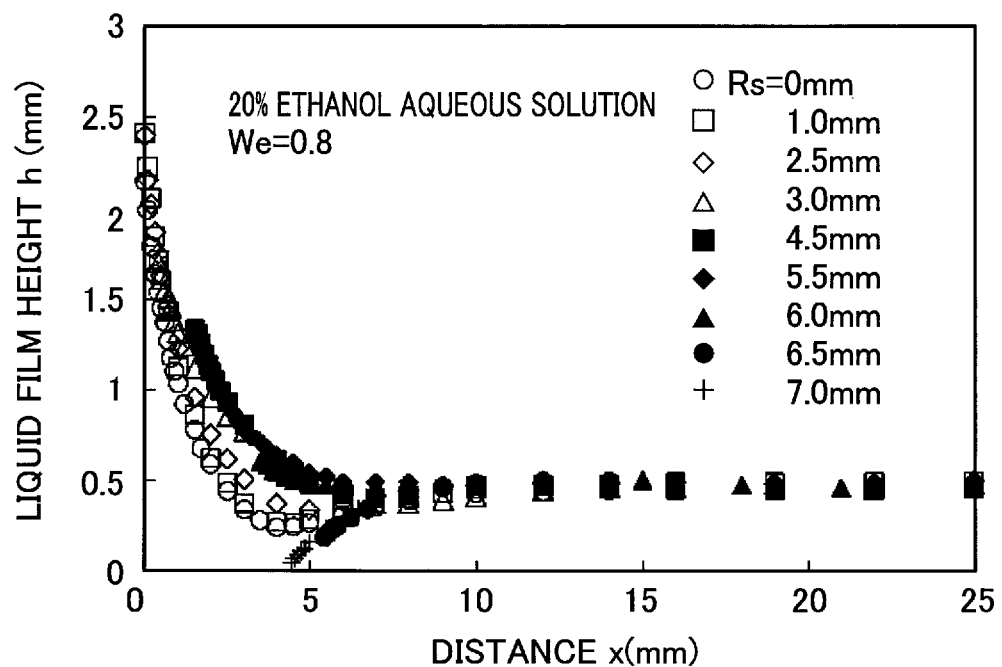
FIG. 7 is a graph illustrating a surface shape of the liquid film when changing the liquid to an aqueous solution having an ethanol concentration of 20% in the experimental measurement on which the graph of FIG. 4 has been prepared.
Figure 8:
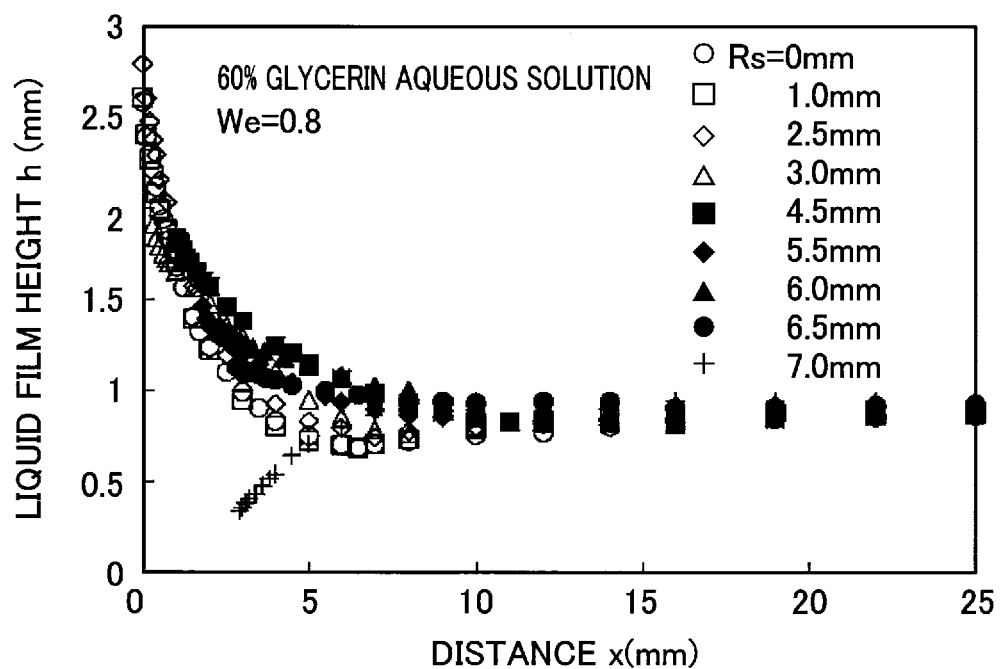
FIG. 8 is a graph illustrating the surface shape of the liquid film when changing the liquid to an aqueous solution having a glycerin concentration of 60% in the experimental measurement on which the graph of FIG. 4 has been prepared.
Figure 9:
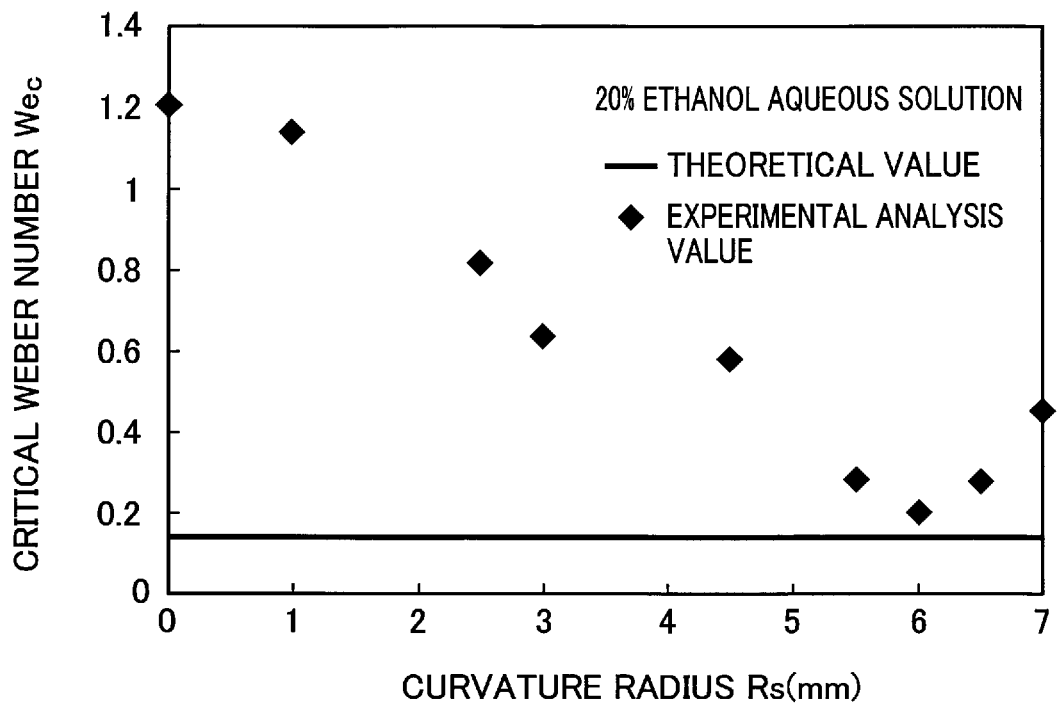
FIG. 9 is a graph obtained from the experimental measurement on which the graph of FIG. 7 has been prepared, illustrating a correlation between the critical Weber number $We_c$ and the curvature radius Rs (mm).
Figure 10:
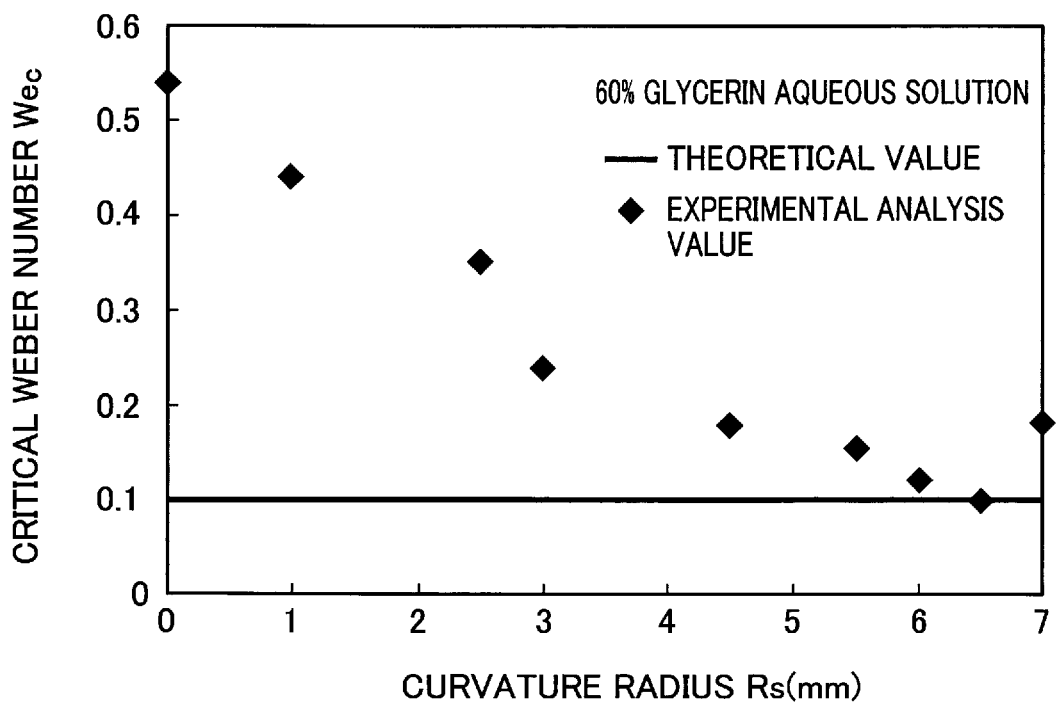
FIG. 10 is a graph obtained from the experimental measurement on which the graph of FIG. 8 has been prepared, illustrating a correlation between the critical Weber number $We_c$ and the curvature radius Rs (mm).

When examining the influence of the physical properties of the liquid on the formation of the liquid film by changing the type of the liquid to be used, for example, measurement results as shown in FIG. 7 to FIG. 10 are obtained. When an aqueous solution having an ethanol concentration of 20% is used as the liquid, the formation of the liquid film is as shown in the graph of FIG. 7. When an aqueous solution having a glycerin concentration of 60% is used, the liquid film formation is as shown in the graph of FIG. 8. With the 60% glycerin aqueous solution having high viscosity, the liquid film height becomes high and the appearance of the minimized region becomes dull. When examining the relationship between the critical Weber number $We_c$ and the curvature radius Rs from each of FIG. 7 and FIG. 8, the results are as shown in the graphs of FIG. 9 and FIG. 10, respectively. In FIG. 9 and FIG. 10, the curvature radius Rs at which the critical Weber number $We_c$ exhibits the minimum value, that is, the optimum value of the curvature radius Rs, is about 6.0 mm in FIG. 9 and about 6.5 mm in FIG. 10. As described above, the shape of the liquid film to be formed varies depending on the physical properties of the liquid, but in any case, the relationship between the critical Weber number $We_c$ and the curvature radius Rs shows a similar trend of change. Therefore, even if the liquid to be used is changed variously, optimizing the curvature radius Rs makes it possible to suppress the appearance of the minimized region in the formation of the liquid film.

<Determination of Optimum Value by Theoretical Calculation>

In the formula (1) showing the Weber number mentioned above, the average velocity U of the liquid and the average thickness δ of the liquid film according to Nusselt's theoretical formula are expressed as shown in the following formula (2) using the flow rate Γ (m²/s) per unit length in the width direction of the liquid film flow (wherein g is the gravitational acceleration, and β is the angle of the liquid film-forming surface with respect to the horizontal plane). Therefore, from the formulas (1) and (2), the average thickness δ of the liquid film can be obtained by the formula (3) with respect to the Weber number We.

$$U = \left(\frac{g\sin\beta \Gamma^2}{3\nu}\right)^{1/3}, \delta = \left(\frac{3\nu\Gamma}{g\sin\beta}\right)^{1/3} \quad (2)$$

$$\delta = \left(\frac{9\sigma\nu^2}{\rho g^2 \sin^2\beta} We\right)^{1/5} \quad (3)$$

On the other hand, the theoretical value of the critical Weber number $We_c$ in the flat plate material without the wall portion is given as the solution of the following formula (4) (wherein $\theta_A$ is the advancing contact angle of the liquid with respect to the flat plate material, and, v is the kinetic viscosity, σ is the surface tension and ρ is the density of the liquid). In the formula (4), in the range of $\theta_A$ being 40 to 110°, v being 0.9 to 7.6 mm2/s, and o being 34 to 72 mN/m, the value of the critical Weber number $We_c$ is a value in the range of 0.1 to 1.2. This value shows good agreement with experimental values for various liquids and contact angle values. The influence of physical properties on $We_c$ is relatively small, and, if the viscosity coefficient is in the range up to about several times relative to the water, the value of the critical Weber number $We_c$ can be approximated as a function of $\theta_A$. That is, it is possible to approximate the critical Weber number $We_c$ by the following formula (5) when the third term of the left side of the formula (4) is small.

$$1.2We_C - (1 - \cos\theta_A) + \quad (4)$$
$$6.94\left(\frac{\rho^3 v^4 \sin\beta}{\sigma^3}\right)^{1/5} We_C^{2/5} \times \left[\frac{\theta_A - \sin\theta_A \cos\theta_A}{(1 - \cos\theta_A)^2}\right] = 0$$

$$We_C \approx 0.833(1 - \cos\theta_A) \quad (5)$$

When the liquid film thickness δ is obtained from the formula (3) using the critical Weber number $We_c$ of the above-described formula (4) and this is taken as the liquid film thickness δc under the critical condition, the following formula (6) is established from the geometrical relationship. In the formula (6), Rc represents the value of the curvature radius Rs when the surface of the liquid film is flat (the minimized region disappears), and the angle $θ_R$ is the receding contact angle of the liquid. Therefore, the optimum value of the curvature radius Rs is Rc obtained from the formula (6) and is expressed by the formula (7). In this way, it is possible to determine the optimum value of the curvature radius Rs by theoretical calculation using the formulas (1) to (7). In this method, the optimum value of the curvature radius Rs is determined based on the critical Weber number $We_c$.

$$(Rc-Sc)=Rc×\cos θ_R \qquad (6)$$

$$Rc=δc/(1-\cos θ_R) \qquad (7)$$

Figure 11:
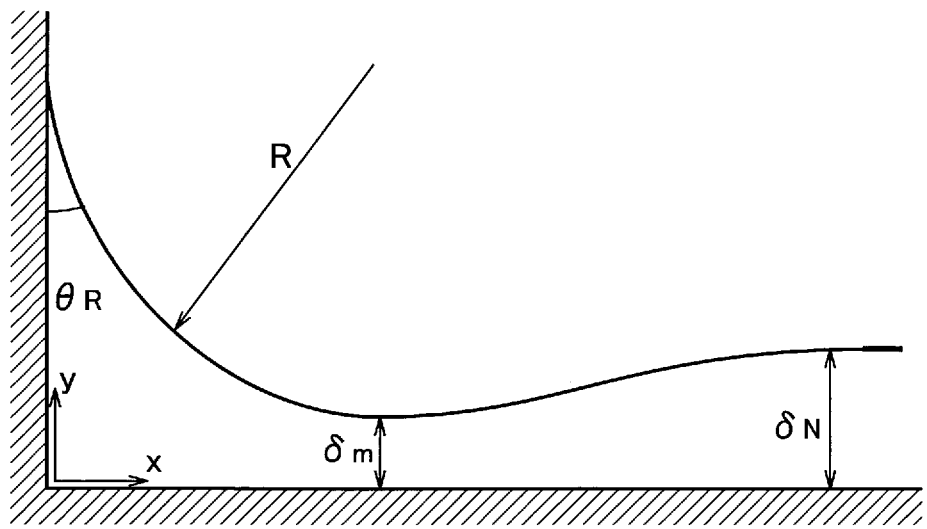
FIG. 11 is a graph illustrating the surface shape of the liquid film formed on the packing element having no curved surface portion (vertical axis: liquid film height h (mm), horizontal axis: distancex(mm) from the wall portion).

With respect to the theoretical calculation of the surface shape of the liquid film, if forming the liquid film on a packing element in which the side surface of the wall portion and the liquid film-forming surface are perpendicular (a curved surface portion is not provided), it can be performed as follows. In this case, as shown in FIG. 11, the surface shape of the liquid film in the range (meniscus portion) from the wall side surface to the position where the film thickness reaches the minimum thickness δm is approximated to the cylindrical surface (curvature radius: R). And the surface shape at the part further away from the wall portion after that is regarded as a continuous curved surface asymptotic to the average thickness $δ_N$ of the liquid film according to Nusselt's theoretical formula. Then the liquid film shape is approximately represented as shown in the following formula (8). At this time, when λ is set as follows so that the curvature of the surface shape coincides at $x=R \cos θ_R$, the average thickness $δ_N$ when the liquid film satisfies the critical condition ($δ_N=δ_m$) is given by the following formula (9).

$$λ = 2π(2(δ_N - δm)R)^{1/2} \qquad (8)$$

$$0 ≤ x ≤ Rcosθ_R: δ = R + δ_m - \sqrt{R^2 - (x - Rcosθ_R)^2}$$

$$δ = \sqrt{2}(δ_m - δ_N)$$

$$\sin\left[\frac{2π(x - Rcosθ_R)}{λ} + \frac{π}{4}\right] × \exp\left[-\frac{2π(x - Rcosθ_R)}{λ}\right] + δ_N$$

$$δ_N = \frac{\left(R + δ_m - \frac{R}{2}\sinθ_R\right)Rcosθ_R - \left(\frac{π}{4} - \frac{θ_R}{2}\right)R^2 + \frac{λ}{2π}(δ_m - δ_N) + λδ_N}{R(1 - \sinθ_R + \cosθ_R) + δ_m + λ} \qquad (9)$$

Further, in order to determine the curvature radius R (meniscus portion) and the minimum thickness δm in the formula (9), the condition for minimizing the energy increment ΔE in the system of FIG. 11 is determined. The energy increment ΔE is the sum of the surface energy variation ΔEs, the velocity energy variation ΔEk, and the potential energy variation ΔEp (ΔE=ΔEs+ΔEk+ΔEp). By determining these, the curvature radius R at which the energy increment ΔE becomes the minimum can be determined, and the surface shape of the liquid film is determined from the formula (9). As for the surface energy variation ΔEs, energy change in wetting the side surface of the wall portion (that is obtained from the equation of Young, using the surface tension σ) and the amount of work accompanying an increase in the gas-liquid interface area are obtained, and it is then defined as the sum of these. The velocity energy variation ΔEk is obtained by assuming velocity distribution that is divided into a Nusselt distribution region and a constant velocity region, and integrating the velocity energy using this velocity distribution. As the value of dividing the regions in the velocity distribution, the film thickness δc is used, that is determined by the condition under which the gravity acting on the liquid film near the wall portion is balanced with the viscous force. The potential energy variation ΔEp is obtained from the geometrical relationship.

Figure 12:
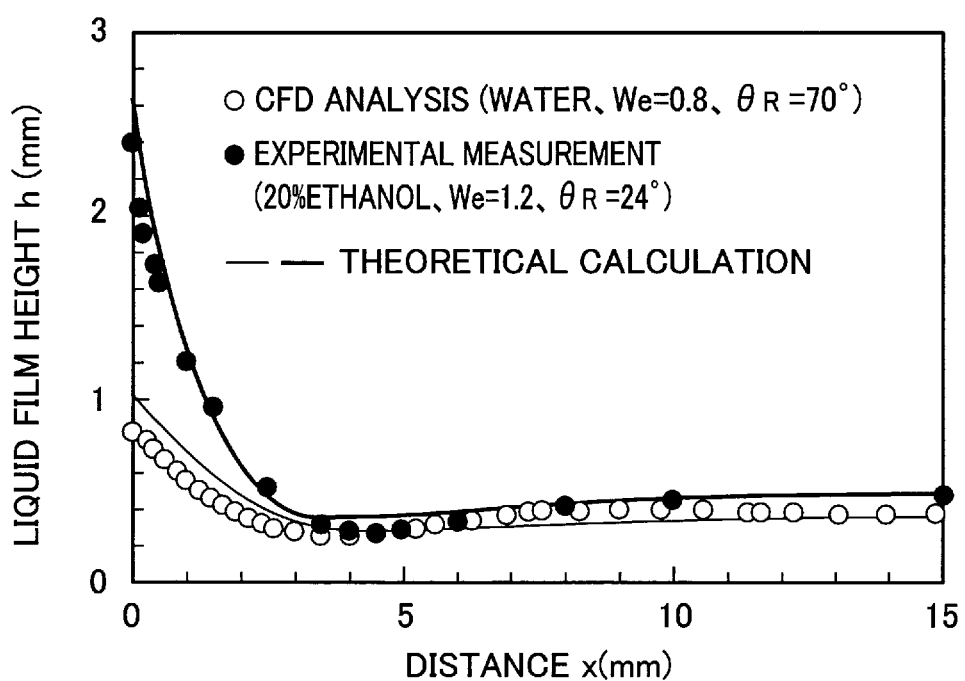
FIG. 12 is a diagram schematically showing the surface shape of the liquid film formed on the packing element.

FIG. 12 shows the result obtained in a case where the liquid film is formed on a flat plate material having the wall portion, by experimental measurement or CFD analysis of the relationship between the height (=film thickness) h of the liquid film and the distance x from the wall portion. FIG. 12 also shows the surface shape of the liquid film determined from the formula (9), by the above theoretical calculations. The experimental measurement and the CFD analysis have different setting conditions, respectively, but it is understood that theoretical calculation can obtain a result close to the result of experimental measurement or CFD analysis under any setting condition. Therefore, also for the liquid film formed on the packing element formed so that the side surface of the wall portion and the liquid film-forming surface are continuous through the curved surface portion, it is possible to determine the surface shape of the liquid film by taking the curved surface portion into the shape of the liquid film-forming surface in the theoretical calculation described above, and to determine the optimum value of the curvature radius Rs from the relationship between the curvature radius Rs of the curved surface portion and the surface shape of the liquid film.

A method for manufacturing a packing includes a designing step of designing a packing element, and a fabricating step of fabricating the designed packing element, using a raw material. In the designing step, a packing element having a main body and at least one wall portion is designed in such a manner that a side surface of the wall portion has, at a base connected to a liquid film-forming surface, a curved surface portion curving so as to be continuous to the liquid film-forming surface. At that time, an optimum curvature radius is obtained by a determination step according to the following determination procedure, so that the curved surface portion having such a curvature radius can be designed.

<Determination Procedure>

To determine the optimum value of the curvature radius Rs of the curved surface portion by experimental measurement, candidate packing elements having the curved surface portion with different curvature radius Rs are prepared by using the material of the packing element. Then the measurement of the surface shape of the liquid film or the critical Weber number $We_c$ as described above is performed repeatedly with use of each packing element.

In the measurement of the surface shape, as a result, data (the distance x and the liquid film height h) on the surface shape at each curvature radius Rs are obtained, as shown in FIG. 4. From the obtained surface shape, the curvature radius Rs is determined which gives the surface shape in which the appearance of the minimized region is most suppressed (or disappears). Alternatively, as shown in FIG. 5, the minimum value of the liquid film height and the value of the liquid film center portion at each curvature radius Rs are extracted from the surface shape data. And the curvature radius Rs at which the difference between the minimum value of the liquid film height and the value of the liquid film center portion is minimized is determined. That is, the difference between the minimum value of the liquid film height and the value of the liquid film center portion is calculated for each curvature radius Rs, and these values are compared to determine the optimum value of the curvature radius Rs.

In the measurement of the critical Weber number $We_c$, the relationship between the critical Weber number $We_c$ and the curvature radius Rs as shown in FIG. 6 is obtained. Therefore, based on the obtained relationship, the curvature radius Rs at which the critical Weber number $We_c$ becomes the minimum value is determined as the optimum value.

In the above work, by performing CFD analysis instead of the experimental measurement, the optimum value of the curvature radius Rs can similarly be determined. Since the CFD analysis is a known analysis method, it is advisable to perform it according to the usual method. Solving a mass conservation equation (equation of continuity) and a momentum conservation equation (Navier-Stokes equation) in a one-fluid model gives numerical analysis results of three-dimensional unsteady flow. In the analysis, general-purpose thermal fluid analysis software can be used and, for example, FLUENT (registered trademark, ANSYS, Inc.), etc., can be mentioned. The behavior of the gas-liquid interface can be predicted by using the interface tracking method, and an example thereof is a VOF (Volume of Fluid) model. Determining the kinds of gas, liquid and solid (liquid film-forming surface), and setting the angle β of the liquid film-forming surface and the ambient temperature, the liquid film thickness at the boundary of the liquid entrance is defined. Then the analysis is allowed under the condition of inflow at uniform flow velocity.

An example of a method for determining the optimum value of the curvature radius Rs of the curved surface portion by the theoretical calculation will be described below. In this method, the optimum value of the curvature radius Rs is determined based on the relationship between the critical Weber number $We_c$ and the curvature radius Rs.

As setting of conditions, first, the material of the packing element to use, the composition of the liquid, and the execution condition (temperature) are set. On the bases of these, properties (density, viscosity, surface tension) of liquid and characteristics relating to solid-liquid contact (advancing contact angle or receding contact angle) are set. Further, the installation condition of the packing element (angle β of the liquid film-forming surface with respect to the horizontal plane) is determined.

Next, the critical Weber number $We_c$ is calculated from the advancing contact angle $\theta_A$ of the liquid according to the above-described formula (5). Using the obtained critical Weber number $We_c$, the dynamic viscosity v of the liquid, the surface tension σ, the density ρ, and the angle β of the liquid film-forming surface with respect to the horizontal plane, the average thickness δ of the liquid film represented by the above formula (3) is calculated. Using this calculated value as the liquid film thickness δc under the critical condition, the curvature radius Rc is obtained from the above formula (7). This value is the optimum value of the curvature radius Rs.

The optimum value of the curvature radius Rs obtained is an approximate value, but, if the above experimental measured or CFD analysis is performed based on this value, it is possible to confirm or adjust the optimum value. In other words, the experimental measurement and the CFD analysis may be used to confirm or adjust the optimum value of the curvature radius Rs determined by the theoretical calculation. By narrowing down the candidate range of the curvature radius Rs by theoretical calculation, a prototype of the packing element can be prepared based on this result to perform experimental measurement or CFD analysis, whereby the packing element can be designed with high accuracy and efficiency. Therefore, it is useful also in a case of adapting to change of execution condition or device improvement in the gas-liquid contact apparatus 2. In general, the curvature radius Rs can be set within a range of about 0.5 to 50 mm. In many cases, the receding contact angle $\theta_R$ of the liquid with respect to a metal surface is about 20 to 30°, and the curvature radius Rs, in that case, can be determined to a value of about 3 to 10 mm by the above-described method.

Preparing a plurality of the packing elements 10 designed as described above, they are arranged in parallel so that the positions of the wall portions are aligned in rows, thereby the packing 1 can be constructed. Considering that the wall portion W can function as a spacer when constructing the packing 1, it is appropriate to set the height of the wall portion W according to the requirement as the spacer in designing of the packing element 10. From the viewpoint of strength, it is suitable to provide the wall portion W substantially perpendicular to the liquid film-forming surface. It is convenient to set in such a manner that the flow path is formed at intervals at which the liquid film formation and the gas flow can be satisfactorily performed when the liquid A and the gas G are supplied to the packing 1. The height of the wall portion W (the level difference between the top portion of the wall portion W and the liquid film-forming surface) may be suitably set so that the flow resistance of the gas becomes low. Under ordinary gas-liquid contact conditions, the height of about 1 mm or more is suitable and, if setting to about 1 to 10 mm, it is also well in gas-liquid contact efficiency per volume, etc. In the case of the height equal to the curvature radius Rs of the curved surface portion Sc, the curved surface portion Sc is ¼ of the cylindrical surface. The height may be smaller than the curvature radius Rs. When the height exceeds the curvature radius Rs of the curved surface portion Sc, the side surface Sw of the wall portion W has a flat surface portion perpendicular to the liquid film-forming surface and continuous to the upper side of the curved surface portion Sc. However, a configuration without the flat surface portion is also possible in the form that the height exceeds the curvature radius Rs.

Further, from the viewpoint of reinforcing the main body portion, the thickness of the wall portion W and the distance between the wall portions W (which is substantially equal to the width of the liquid film-forming surface) are appropriately set so as to satisfy the reinforcement requirements. As the width of the liquid film-forming surface decreases, the minimized region is less likely to occur in the liquid film formed. Therefore, if the distance between the wall portions W set based on the reinforcement requirements is small, it is not necessary to specify the curvature radius Rs of the curved portion as the optimum value. That is, it is allowed to set within a range of a certain extent including the optimum value. Considering this point, the shape of the curved surface portion Sc is not limited to a cylindrical surface shape, but it is also possible to form in another concave curved shape in which the side surface of the wall portion and the liquid film-forming surface are continuous, for example, an elliptical cylindrical surface shape or the like. On this occasion, it is possible to design the curved portion of a similar shape to have an appropriate curvature with reference to, for example, the above-described cylindrical curved surface portion Sc having the optimum curvature radius Rs.

Based on the design of the curved surface portion Sc as described above, it is possible to manufacture a packing element 10 having a pair of wall portions at both side ends of the liquid film-forming surface as shown in FIG. 3, using a rectangular flat plate material. In a flow path in which the cross section perpendicular to the flow direction is toughly rectangular such that the distance between the wall portions (substantially equal to the width of the liquid film-forming surface) is set to be twice or more the height of the wall portion, it is possible to suitably form a liquid film extending in the liquid flowing direction without converging the liquid flowing on the liquid film-forming surface. Therefore, the liquid and the gas are in good contact with each other. Practically, it is possible to achieve both efficient gas-liquid contact with suitable liquid-film formation and securing of the strength of the packing element, by constructing the flow channel of thin layer in which the distance between the wall portions is about 5 to 1,000 times, particularly about 10 to 100 times the height of the wall portions. With such a configuration, the gas-liquid contact area per volume can be set to be large, and it is thus possible to efficiently perform large capacity processing while suppressing pressure loss (i.e., increase in energy consumption) of gas. Therefore, it is advantageous in application to a large-sized gas-liquid contact apparatus. The configuration of the packing element 10 shown in FIG. 3 is a basic configuration, and various applications and modifications are possible. Specific examples thereof will be described below, but the packing element 10 in the present application is not limited to these, and various changes can be made in consideration of the environment in which gas-liquid contact is performed, manufacturing conditions of packing, and the like.

Figure 13A:
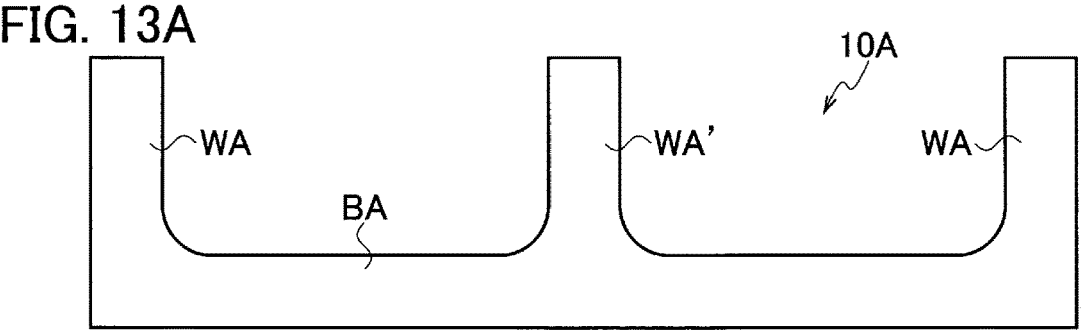
FIG. 13A to FIG. 13E are perspective views illustrating embodiments of the packing element having the curved portion.
Figure 13B:
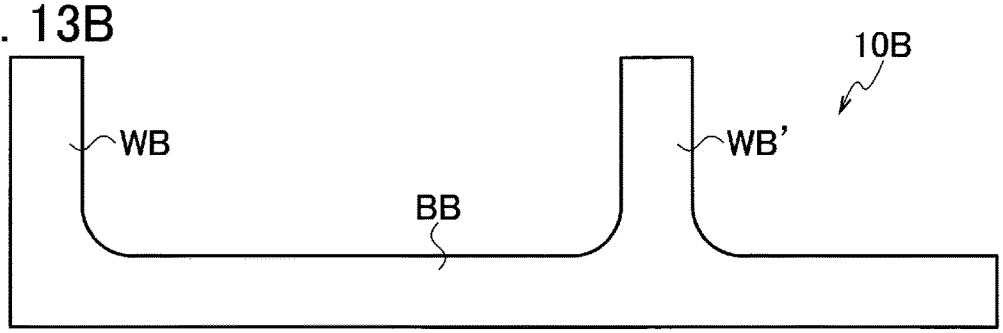
Figure 13C:
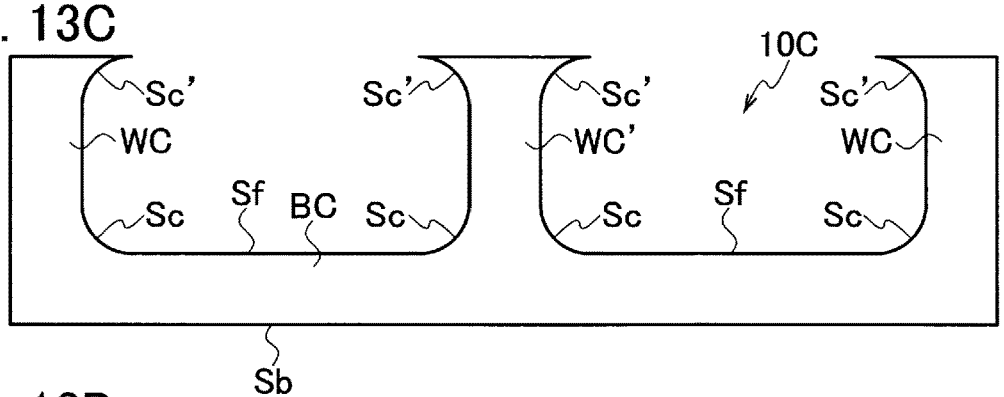
Figure 13D:
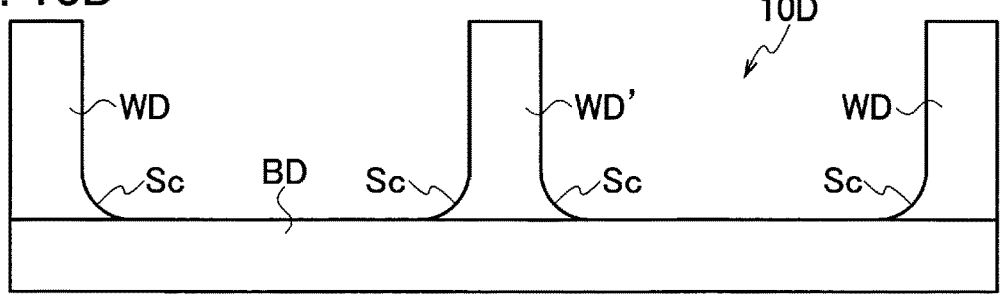
Figure 13E:
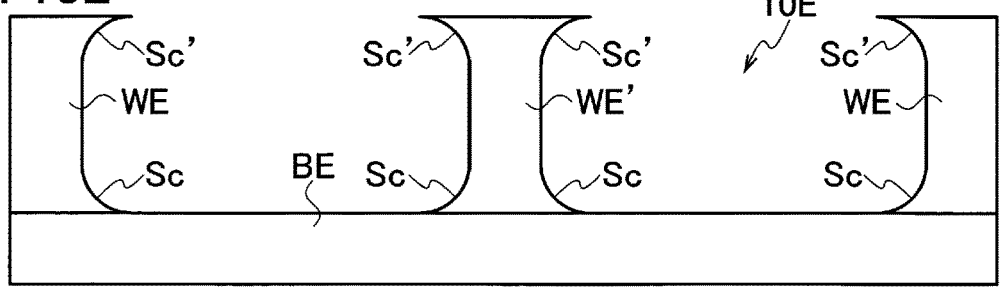

The packing elements 10A, 10B and 10C of FIG. 13A to FIG. 13C are embodiments configured so that the wall portions and the main body portion are integral with each other. The packing elements 10D and 10E of FIG. 13D and FIG. 13E are embodiments configured to have the same shape as the packing element 10A or 10C by joining the wall portions and the main body portion prepared as separate bodies. The packing elements 10A, 10B and 10C can be manufactured by cutting processing for forming grooves in a plate-like material, molding of a molten raw material, or the like. Since the packing elements 10D and 10E are obtained by fabricating each part from the raw material and bonding the wall portions and the main body portion by a bonding method applicable to the material, there are wide varieties of methods applicable to the forming and processing of each part.

The packing element 10A of FIG. 13A has wall portions WA at the both side ends of the main body portion BA and a wall portion WA' at the center, and the reinforcing effect by the wall portions is larger than that in the configuration of FIG. 3. That is, it is possible to change the number and positions of the wall portions appropriately according to the degree of necessity of reinforcement. It is not necessary to provide the wall portion at both side ends of the main body portion, and a structure such that the wall portion is not provided on one side or both sides is allowed as well. For example, in the packing element 10B of FIG. 13B, one side end of the main body portion BB has no wall portion, and additionally, the wall portion WB' is provided at a position deviated from the center. Although this packing element 10B is biased in terms of strength balance, it is available if the balance as the whole packing assembled from the packing elements is good, or if the positions of the wall portions are aligned as a whole in a raw.

When installing and using the packing elements so that the liquid film-forming surface is vertical, it is possible to form the liquid film not only on the liquid film-forming surface between the wall portions but also on the back surface opposite to the wall portions. Therefore, in such a usage form, it is preferable that the liquid film breakage is possibly suppressed on both surfaces. The packing element 10C of FIG. 13C has a configuration in which liquid film breakage on the back surface Sb of the main body portion BC can be suppressed in the packing assembled by arranging a plurality of the packing elements in parallel. In the packing element 10C, the tips of the wall portions WC, WC' are spread in the same manner as their base and they are formed with a curved surface portion Sc' having the same curvature radius as the curved surface portion Sc at the base. Therefore, when the packing elements 10C are arranged side by side in a stacked state, the tip ends of the wall portions WC, WC' are brought into close contact with the back surface of the adjacent packing element, so that the curved surface portions Sc' of the tips become continuous with the back surface of the adjacent packing element. Then the back surface becomes in the same state as the liquid film-forming surface Sf. When the raw material has ductility such as metals, the packing element 10C can be obtained by deforming the tips of the wall portions WA, WA' of the packing element 10A having the shape of FIG. 13A, by using plastic working by pressure such as forging, so as to shape like the tip portions of wall portions WC, WC'. When the raw material is softened by heating or the like, the tip of the wall portion can be softened and shaped in the same manner. In the embodiment as shown in FIG. 13C, it is also possible to make a change such that the height of the wall portions WC, WC' is lowered so that the side surfaces of the wall portions WC, WC' are constituted only by the curved surface portions Sc, Sc'. In this case, though the height of the wall portions WC, WC' exceeds the curvature radius Rs, the side surfaces do not include a planar portion.

In the packing elements 10D and 10E of FIG. 13D and FIG. 13E, the main body portions BD and BD are flat plates. Therefore, it is possible to fabricate them by processing ribs corresponding to the wall portions WD, WD', WE, WE' and joining them to the flat plate. These embodiments are advantageous in that 1) the wall potion and the main body portion can be made of different materials, and 2) it is easy to redo the forming process and reduction of the manufacturing loss is easy. Examples of the bonding method include utilization of a known adhesive, thermocompression bonding, welding, fusion bonding, and the like. Moreover, it is possible to modify the form of the packing elements 10D, 10E so that positioning and joining can be performed at the same time. For example, in a flat plate to constitute the main body portion BD or BE, grooves or holes for fitting are provided at the positions where the wall portions are to be joined. And the wall portions WD, WD', WE, WE' are formed so that projections which can be fitted into the grooves or holes protrude from the bottom surfaces (bonding surfaces) of the wall portions. Then, by fitting the projections into the grooves or holes, the joining of the two is completed.

Figure 14:
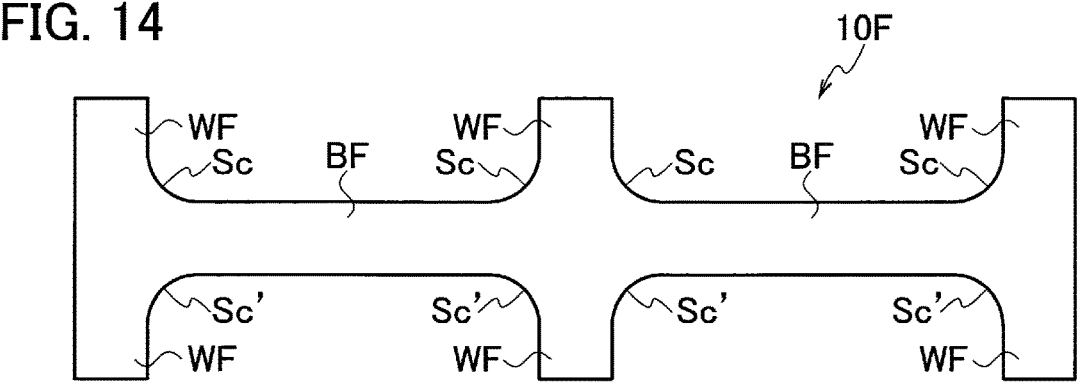
FIG. 14 is a perspective view illustrating another embodiment of the packing element having the curved portion.

The packing element 10F shown in FIG. 14 is an embodiment having liquid film-forming surfaces on both the front and back surfaces. Since the wall portions WF are provided to stand on both sides of the main body portion BF and the curved portions Sc and Sc' are formed at the base of the wall portions WF, suitable liquid film-forming surfaces are formed on both surfaces of the main body portion BF. Therefore, for use in a vertical standing position, this embodiment may be in a single state or a stacked state of plural members.

FIG. 15A to FIG. 15E show embodiments of the packing element that can be fabricated by bending processing of a material of thin layer plate shape that can be plastically worked. Therefore, in these embodiments, the main body portion BG to BK is integral with the wall portion WG to WK.

Figure 15A:
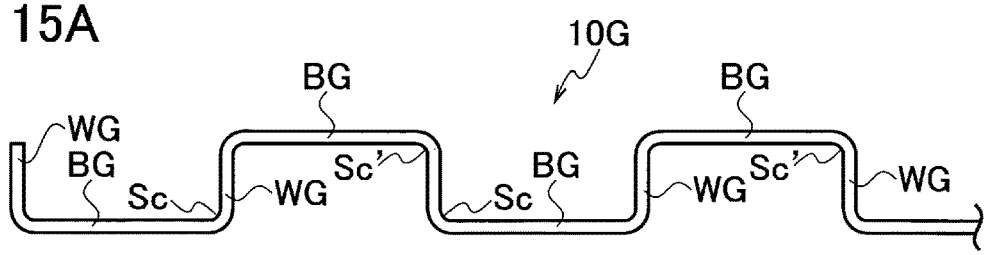
FIG. 15A to FIG. 15E are perspective views illustrating further embodiments of the packing element having the curved portion.

The packing element 10G of FIG. 15A is an embodiment in which the bending processing is performed into a corrugate form. On one surface, a liquid film-forming surface having curved surface portions Sc at both side ends is formed, and on the other surface, a liquid film-forming surface having curved surface portions Sc' is formed. Therefore, in this embodiment, good liquid film is formed on both surfaces in use in a vertical standing position, as with the packing element 10F. On the back side of the liquid film-forming surface sandwiched between the wall portions WG, the minimized region does not occur in the liquid film shape and the liquid film is formed satisfactorily on the back side as well.

Figure 15B:
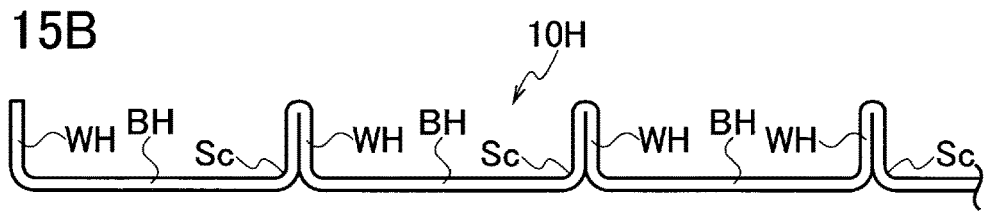

The packing element 10H of FIG. 15B is an embodiment formed into a shape corresponding to the packing elements 10A, 10D of FIG. 13A and FIG. 13D. The tip end of the wall portion WH is formed by folding a part of the thin layer plate material and bring into close contact, and the base of the wall portion WH is bent to form the curved portion Sc. As a result, the liquid film-forming surface in which both side ends are continuous with the curved surface portion Sc is formed on the surface of one side. Therefore, the packing element 10H has the same function as the packing elements 10A, 10D of FIG. 13A and FIG. 13D, and good liquid film is formed on the liquid film-forming surface between the wall portions WH in use in a state where it is inclined from the vertical direction (angle $\beta<90°$). The shape of the packing element 10H may be changed to one shown in FIG. 15D or FIG. 15E. The wall portion WJ of the packing element 10J is formed by bending the thin layer plate material in a V-shape so as not to be in close contact, and the side surface of the wall portion WJ is not perpendicular to the main body portion BJ but is inclined. Still, a curved surface portion Sc is similarly formed at the base of the wall portion WJ. The wall portion WK of the packing element 10K is formed by curving a thin layer plate material into a waveform, and the curved portion Sc is similarly formed at the base of the wall portion WK.

Figure 15C:
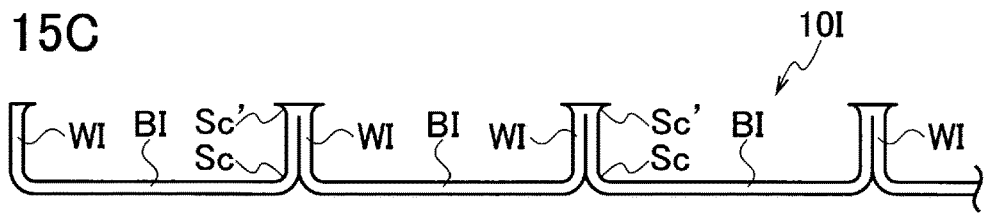
Figure 15D:
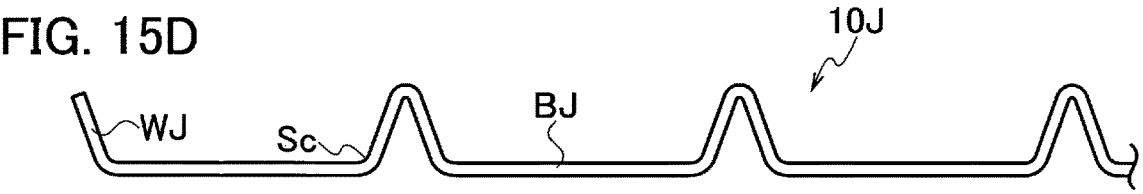
Figure 15E:
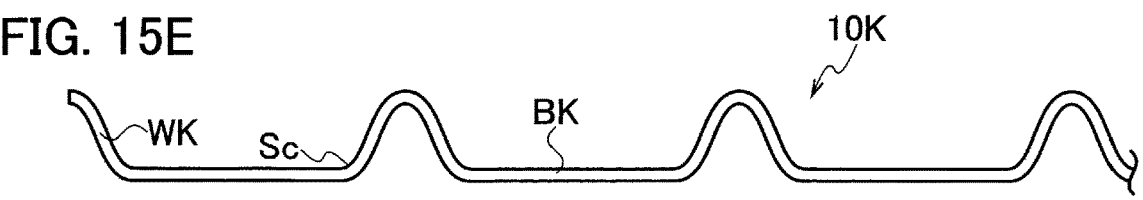

The packing element 10I of FIG. 15C is an embodiment formed into a shape corresponding to the packing elements 10C, 10E of FIG. 13C and FIG. 13E. The wall portion WI is obtained by forming the wall portion WH of FIG. 15B and then subjecting it to forming processing so that the tip of the wall portion expands similarly to the base thereof, and plastic working as described for the embodiment of FIG. 13C is available.

In this manner, the influence by the wall portion on the formation of the liquid film is suppressed by designing the packing element to have a curved surface portion of a suitable curvature at the boundary between the side surface of the wall portion and the liquid film-forming surface. Thus, a packing element is provided in which the liquid film is formed in a satisfactory state. The main body portion is reinforced by providing the wall portion standing up with respect to the planar liquid film-forming surface. When assembling the packing by arranging a number of packing elements in parallel, the wall portion also functions as a spacer, so that the assembling work is easy. Therefore, deformation and distortion of the packing at the time of gas-liquid contact treatment can be suppressed while weight reduction can be achieved. Thus, it is possible to reduce the weight of the apparatus to which the packing is applied. In addition, it is possible to reduce the cost for manufacturing and processing the packing, which is economically very advantageous.

Utilizing the thin layer packing element as described above, it is possible to construct various columnar packings that are not limited to rectangular columnar or cylindrical packings but include polygonal columnar packings, elliptic cylindrical ones, and the like. In the packing elements for constituting a columnar packing, the shape of the main body B is a rectangle that corresponds respectively to parallel cross sections obtained by cutting the cylinder at equal intervals along the axial direction, and the packing elements used have different lateral widths. Lining up all the packing elements, the packing 1 is assembled, and it is loaded into a container 3 having an annular sidewall. When the positions of the wall portions are aligned so that the wall portions are contiguously straight in the state where the packing elements are juxtaposed, the strength of the packing as the whole can be obtained.

Examples of the gas G processed by the gas-liquid contact apparatus 2 using the packing 1 as described above include a waste gas (exhaust gas) and a reactant gas generated in a facility such as a chemical plant or a thermal power plant. An acid gas such as carbon dioxide, nitrogen oxides, sulfur oxides, and the like is processed as the specific component. The liquid A to use as the absorbent is selected according to the specific component to be removed from the gas G. For recovery and removal of carbon dioxide, for example, an aqueous solution of an alkali agent such as a cyclic amine compound, alkanolamine, phenolamine, an alkali metal salt, etc. is often used. An aqueous solution of an alkaline agent such as a calcium compound or a magnesium compound is generally used for removal of sulfur oxides. In a monoethanolamine (MEA) aqueous solution often used in recovery of carbon dioxide, carbamate salt/amine salt (carbamate), carbonate, bicarbonate and the like produce due to the reaction with carbon dioxide.

Therefore, each part constituting the gas-liquid contact apparatus 2 is made of a material having resistance to the components of the gas G and the chemical agents contained in the liquid A as described above. Examples of such a material include metals such as stainless steel, aluminum, nickel, titanium, carbon steel, brass, copper, monel metal, silver, tin, niobium, and resins such as polyethylene, polypropylene, PTFE, etc. At least the surface of the packing 1 and the packing elements constituting the packing 1 is made of a corrosion-resistant material which does not cause reaction (corrosion) with the gas G to be treated and the liquid A to be used as described above. The surface of the material may be roughened by forming fine irregularities on the surface by means of surface finishing such as filing, sand blasting treatment, ultraviolet ozone treatment, plasma treatment and the like. In addition, the material may be one prepared to meet the above-described use conditions by modifying the surface by means of coating or the like. In the case of using a metal material, the packing element can be easily prepared by subjecting a flat plate or thin layer material having uniform thickness to groove processing or bending processing. In the case of making it from a resin material, it can be manufactured by applying heat in bending processing or introducing a molten resin into a mold and molding it. A mesh plate material such as a wire mesh using a metal wire, a punched metal plate, an expanded metal plate or the like is a plate material capable of reducing the weight while maintaining the strength to stand alone as a single body, and it exhibits excellent property also in wet spreading of liquid. Therefore, it is a preferable material as the packing. In the case where the mesh is extremely fine, the liquid film formed as an aggregate of serpentine flow approaches a layered state and it becomes possible to form a liquid film similar to that on the flat plate. Therefore, its application to the material constituting the packing element, for example, as shown in FIG. 15 is allowable.

As can be understood from the above, according to the present disclosure, a packing is provided which is suitable for application to a gas purification apparatus, a gas separation apparatus, etc. that separates, removes or recovers a specific gas component such as acid gas and harmful gas from a gas to be treated such as exhaust gas and mixed gas. Moreover, a manufacturing method is proposed for a packing that exhibits excellent performance in gas-liquid contact between a gas to be treated and an absorbing liquid. Incidentally, application of the packing 1 according to the present disclosure is not limited to the gas-liquid contact apparatus for absorbing, separating or removing a specific component as described above. It is also applicable to apparatuses (a distillation column, a purification column, a stripping column (regeneration column) and the like) used in various chemical plants including a chemical process such as distillation, purification, and stripping.

EXAMPLES

<Preparation of Samples>

A flat plate material made of stainless steel (SUS304) having a length of 60 mm was prepared, and a flow channel (lateral width <50 mm, depth <5 mm) having a rectangular cross section was formed along the longitudinal direction of the flat plate material. This work was carried out by scraping by electric discharge machining and finishing with an end mil having a diameter of 20 mm. Further, using a radius end mill, processing was applied to the bottom surface and the side surfaces of the flow channel. Thereby, it was finish into a shape having a lateral width of 50 mm and a depth of 5 mm and having a curved surface portions (curvature radius Rs=1.0 mm) curved in a cylindrical surface on both sides of the bottom surface of the flow channel.

By changing the radius end mill used in the above work to one having a different tip curvature and repeating the same operation, flat plate materials having the curved surface portions of the flow channel at a different curvature radius (curvature radius Rs=2.5 mm, 3.0 mm, 4.5 mm, 5.5 mm, 6.0 mm, 6.5 mm, and 7.0 mm).

<Measurement of Shape of Liquid Film Surface>

Using the flat plate material having the above-mentioned flow channel as a sample of the packing element 10, the shape of the liquid film surface was measured as follows.

The flat plate material was placed so that the angle β of the flat plate material with respect to the horizontal plane was 60°, and water (20° C., Weber number We=0.8) was supplied as a liquid to the flow channel at a predetermined flow rate to flow on the bottom surface (liquid film-forming surface) of the flow channel. Whereby the liquid film was formed. The supply of water was performed uniformly so that the supply amount per unit in the width direction of the flow channel was the same.

According to the stylus method using a needle probe (outer diameter of the stylus=0.5 mm, stylus angle θ=10° with respect to the vertical direction), the surface of the liquid film at a position of 30 mm downstream from the supply port of the flow channel was measured along the width direction of the flow channel. From the results of measurement, the liquid film height was determined as the position of the liquid film surface with reference to the liquid film-forming surface. By plotting the relationship between the distance from the side surface of the flow channel and the liquid film height, the surface shape as shown in FIG. 4 was obtained.

<Measurement of critical Weber number $We_c$>

The flat plate material was installed in the similar manner to the measurement of the shape of the liquid film surface, and water was supplied to the flow channel while the flow rate was gradually increased. As a result, the liquid film formed on the bottom surface of the flow channel expanded, and the flow rate of water when the dry out region disappeared and the liquid film was formed on the entire bottom surface of the flow channel was determined. Using this, the critical Weber number $We_c$ was calculated from the formula (1). A graph showing the relationship between the obtained critical Weber number and the curvature radius of the curved surface portion was obtained as shown in FIG. 6.

<Measurement 1 Using a Different Liquid>

The measurement of the shape of the liquid film surface described above was repeated in the same manner as above, except that the liquid to be supplied to the flow channel was replaced with an aqueous solution (20° C., Weber number We=0.8) having an ethanol concentration (mass value) of 20%. A graph showing the relationship between the distance from the side surface of the flow channel and the liquid film height was prepared, and the surface shape as shown in FIG. 7 was obtained. From this result, the relationship between the curvature radius Rs of the curved surface portion and the critical Weber number $We_c$ was determined and a graph as shown in FIG. 9 was obtained. In this graph, the optimum curvature radius Rs at which the critical Weber number $We_c$ was minimized was about 6.0 mm.

<Measurement 2 Using a Different Liquid>

The measurement of the shape of the liquid film surface described above was repeated in the same manner as above, except that the liquid to be supplied to the flow channel was replaced with an aqueous solution (20° C., Weber number We=0.8) having a glycerol concentration (mass value) of 60%. A graph showing the relationship between the distance from the side surface of the flow channel and the liquid film height was prepared, and the surface shape as shown in FIG. 8 was obtained. From this result, the relationship between the curvature radius Rs of the curved surface portion and the critical Weber number $We_c$ was determined and a graph as shown in FIG. 10 was obtained. In this graph, the optimum curvature radius Rs at which the critical Weber number $We_c$ was minimized was about 6.5 mm.

Although the embodiments of the present disclosure have been described above with reference to the accompanying drawings, the present disclosure is not limited to such embodiments. Moreover, it must be understood that various changes or modifications that can be conceived by those skilled in the art are naturally also within the technical scope of the present disclosure, in the scope described in the claims.

A gas-liquid contact apparatus with good energy efficiency at the time of operation is provided and good gas-liquid contact and efficient component transfer can be realized while suppressing pressure loss. Therefore, it is possible to contribute to improvement of efficiency in chemical treatment and manufacturing processing, prevention of environmental pollution by popularization of treatment of exhaust gas such as combustion gas and the like, with generalization based on economic improvement. Moreover, it is possible to contribute to effective use of resources by reducing the weight of the apparatus and reducing manufacturing and processing cost.

What is claimed is:

1. A packing for gas-liquid contact, having at least one packing element of a thin layer shape that is placed in a standing position, the packing element of the thin layer shape comprising:
    a main body portion having a planar liquid film-forming surface extending along a liquid flow direction; and
    at least one wall portion that is provided upright relative to the liquid film-forming surface and extending along a liquid flow linear direction,
    wherein the wall portion has a side surface which has a curved surface portion at a base connected to the liquid film-forming surface, the curved surface portion curving so as to be continuous to the liquid film-forming surface, and
    wherein the curved surface portion is a concave surface along a cylindrical surface and is curved with a curvature radius at which a critical Weber number in a liquid film formed by a liquid on the liquid film-forming surface is minimized.

2. The packing according to claim 1, wherein the wall portion is provided substantially perpendicular to the liquid film-forming surface, and the side surface of the wall portion has a flat surface portion perpendicular to the liquid film-forming surface and continuous to the curved surface portion.

3. The packing according to claim 2, wherein the packing element has a pair of the wall portions at both side ends of the liquid film-forming surface.

4. The packing according to claim 1, wherein the packing element has a pair of the wall portions at both side ends of the liquid film-forming surface.

5. The packing according to claim 4, having a plurality of the packing elements assembled in a parallel state so that the wall portions are positioned to be aligned.

6. The packing according to claim 1, having a plurality of the packing elements assembled in a parallel state so that the wall portions are positioned to be aligned.

7. The packing according to claim 6, wherein each of both side ends of the liquid film-forming surface is provided with the wall portion, and
    wherein in the state where the plurality of the packing elements are assembled, the main body portions of each of the plurality of the packing elements face each other in a direction perpendicular to the liquid film-forming surface, and a first distance between the wall portions is 10 to 100 times a third distance between the main body portions facing each other.

8. The packing according to claim 7, wherein a top portion of the wall portion has a second curved surface portion extending in a width direction of the liquid film-forming surface, and
    wherein the second curved surface portion is a concave surface along a cylindrical surface and is curved with the curvature radius of the curved surface portion.

9. The packing according to claim 1, wherein each of both side ends of the liquid film-forming surface is provided with the wall portion, and
    wherein a first distance between the wall portions is 10 to 100 times a second distance between a top portion of the wall portion and the liquid film-forming surface in a direction perpendicular to the liquid film-forming surface.

10. The packing according to claim 9, wherein the top portion of the wall portion has a second curved surface portion extending in a width direction of the liquid film-forming surface, and
    wherein the second curved surface portion is a concave surface along a cylindrical surface and is curved with the curvature radius of the curved surface portion.

* * * * *